(12) United States Patent
Lombardo, III et al.

(10) Patent No.: US 8,599,393 B2
(45) Date of Patent: Dec. 3, 2013

(54) PRINTER COMPATABILITY MATRIX LISTING COMPATIBLE AND NON-COMPATIBLE PRINT DRIVERS AND PRINT DRIVERS COMPATIBLE WITH ADAPTATION

(75) Inventors: Matthew John Lombardo, III, Rochester, NY (US); Daniel Keith Rupe, Fairport, NY (US); Matthew Harris DeRoller, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 489 days.

(21) Appl. No.: 12/952,558

(22) Filed: Nov. 23, 2010

(65) Prior Publication Data

US 2012/0127498 A1  May 24, 2012

(51) Int. Cl.
*G06F 3/12* (2006.01)

(52) U.S. Cl.
USPC ......... 358/1.13; 358/1.9; 358/1.15; 358/1.16; 358/1.18; 358/2.1

(58) Field of Classification Search
None
See application file for complete search history.

(56) References Cited

U.S. PATENT DOCUMENTS

| | | | |
|---|---|---|---|
| 5,271,065 A | 12/1993 | Rourke et al. | |
| 5,819,014 A | 10/1998 | Cyr et al. | |
| 6,032,004 A | 2/2000 | Mirabella, Jr. et al. | |
| 6,529,286 B1 | 3/2003 | King | |
| 7,161,705 B2 | 1/2007 | Klassen | |
| 2004/0196496 A1 | 10/2004 | Klassen | |
| 2004/0196497 A1 | 10/2004 | Klassen et al. | |
| 2005/0141007 A1* | 6/2005 | Shirai et al. | 358/1.13 |
| 2007/0070377 A1* | 3/2007 | Hirabayashi | 358/1.13 |
| 2007/0146767 A1* | 6/2007 | Sakura | 358/1.14 |
| 2009/0257082 A1 | 10/2009 | Kohli et al. | |
| 2009/0284783 A1* | 11/2009 | Kaneda | 358/1.15 |

* cited by examiner

*Primary Examiner* — Miya J Cato
(74) *Attorney, Agent, or Firm* — Gibb & Riley, LLC (57) ABSTRACT

An exemplary method or device determines which print drivers are being used within a printing environment. The method or device identifies a plurality of print queues. Each of the print queues is associated with one of the print drivers. The method or device submits a plurality of test documents to each of the print queues to produce a plurality of page description language (PDL) files. The method or device identifies print drivers that produce different types of PDL files as being non-compatible. If corresponding PDL files produced by different ones of the print drivers in response to the test documents contain all identical header commands (in any order) the method or device identifies the different ones of the print drivers as being compatible. If corresponding PDL files produced by different ones of the print drivers in response to the test documents do not contain all identical header commands, the method or device identifies the different ones of the print drivers as being non-compatible. The method or device produces a compatibility matrix listing which of the print drivers are non-compatible and which of the print drivers are compatible.

15 Claims, 8 Drawing Sheets

| Compatibility Matrix | | |
|---|---|---|
| Source Driver | Target Printer | Requires Adaptation |
| DriverA | Printer1 | NO |
| DriverA | Printer2 | NO |
| DriverA | Printer4 | NO |
| DriverA | Printer5 | NO |
| DriverD | Printer1 | NO |
| DriverD | Printer2 | NO |
| DriverD | Printer4 | NO |
| DriverD | Printer5 | NO |
| DriverB | Printer6 | YES |
| DriverB | Printer7 | YES |
| DriverB | Printer8 | YES |
| DriverE | Printer6 | YES |
| DriverE | Printer7 | YES |
| DriverE | Printer8 | YES |
| DriverC | Printer1 | YES |
| DriverC | Printer2 | YES |
| DriverC | Printer3 | YES |
| DriverC | Printer4 | YES |
| DriverC | Printer5 | YES |
| DriverC | Printer8 | YES |

| PDL Types | | | | | |
|---|---|---|---|---|---|
| | DriverA | DriverB | DriverC | DriverD | DriverE |
| PDL Type being produced | PCL6 | PCL5 | PCL6 | PCL6 | PCL5 |

FIG. 1

| Commands Present in PDL Headers | | | | | |
|---|---|---|---|---|---|
| Witness Documents | DriverA | DriverB | DriverC | DriverD | DriverE |
| DocumentA | CmdA CmdB CmdC | CmdF CmdG | CmdK | CmdB CmdC CmdA | CmdF CmdG |
| DocumentA | CmdB CmdC CmdD | CmdF CmdG CmdH | CmdK | CmdB CmdC CmdD | CmdF CmdG |
| DocumentA | CmdA CmdB CmdC CmdD | CmdF CmdG CmdH | CmdK | CmdA CmdB CmdC CmdD | CmdF CmdG |
| DocumentA | CmdA CmdW | CmdI | CmdK | CmdW CmdA | CmdI |

FIG. 2

| Commands Present in PDL Headers | | | | | |
|---|---|---|---|---|---|
| Witness Documents | DriverA | DriverB | DriverC | DriverD | DriverE |
| DocumentA |  | CmdF CmdG |  |  | CmdF CmdG |
| DocumentA | CmdD | CmdF CmdG |  | CmdD | CmdF CmdG |
| DocumentA | CmdD | CmdF CmdG |  | CmdD | CmdF CmdG |
| DocumentA | CmdW | CmdI |  | CmdW | CmdI |

*FIG. 3*

| PDL Types | | | | | |
|---|---|---|---|---|---|
|  | DriverA | DriverB | DriverC | DriverD | DriverE |
| PDL Type being produced | PCL6 | PCL5 | PCL6 | PCL6 | PCL5 |
| PDL Fully Adaptable | NO | NO | YES | NO | NO |

*FIG. 4*

| Driver Compatibility | | |
|---|---|---|
| Driver1 | Driver2 | Requires Adaptation |
| DriverA | DriverD | NO |
| DriverB | DriverE | YES |

*FIG. 5*

| Printer Properties | | | | | |
|---|---|---|---|---|---|
| Printer | Driver(s) | Supports PCL5 | Supports PCL6 | Supports PostScript |
| Printer1 | DriverA | Yes | Yes | No |
| Printer2 | DriverD | Yes | Yes | Yes |
| Printer3 | DriverC | Yes | Yes | No |
| Printer4 | DriverA | Yes | Yes | Yes |
| Printer5 | DriverD | Yes | Yes | Yes |
| Printer6 | DriverB | Yes | No | Yes |
| Printer7 | DriverB | Yes | No | No |
| Printer8 | DriverE | Yes | Yes | Yes |

*FIG. 6*

| Compatibility Matrix | | |
| --- | --- | --- |
| Source Driver | Target Printer | Requires Adaptation |
| DriverA | Printer1 | NO |
| DriverA | Printer2 | NO |
| DriverA | Printer4 | NO |
| DriverA | Printer5 | NO |
| DriverD | Printer1 | NO |
| DriverD | Printer2 | NO |
| DriverD | Printer4 | NO |
| DriverD | Printer5 | NO |
| DriverB | Printer6 | YES |
| DriverB | Printer7 | YES |
| DriverB | Printer8 | YES |
| DriverE | Printer6 | YES |
| DriverE | Printer7 | YES |
| DriverE | Printer8 | YES |
| DriverC | Printer1 | YES |
| DriverC | Printer2 | YES |
| DriverC | Printer3 | YES |
| DriverC | Printer4 | YES |
| DriverC | Printer5 | YES |
| DriverC | Printer8 | YES |

PRINTER COMPATABILITY MATRIX LISTING COMPATIBLE AND NON-COMPATIBLE PRINT DRIVERS AND PRINT DRIVERS COMPATIBLE WITH ADAPTATION

BACKGROUND

Embodiments herein generally relate to printing systems and more particularly to systems and methods that automatically calculate the compatibility of different printers and print drivers and produce a compatibility matrix of such devices and drivers.

In large-scale enterprise printing environments, one challenge is to keep printing costs to a minimum, while not impacting the day-to-day productivity of the employees. Part of that challenge involves ensuring that users can print successfully. Once a user submits a print job, and it does not successfully print, there could be many reasons why the print job was unsuccessful. There may be physical problems with the printer, or network issues that prevent the print job from successfully printing. Or, in environments where a print control system is employed, the print job may be blocked from printing for violating some policy.

Normally, when a print job is unsuccessful, the user needs to resolve the issue, either by calling the help desk and requesting help, or resubmitting the print job to a different device. The job will be spooled again before being sent to the new choice of printer. For large jobs, the repeated process of spooling could take significant time, and impact critical print server resources.

Current solutions require manual setup of redirection rules, and do not ensure that the alternate printer is compatible with the original. Instead, determination of compatibility is left to the user who configured the system. This requires ongoing maintenance to ensure new printers are compatible, and existing redirection rules are accurate. Other solutions force the use of a generic universal print driver, which restricts the functionality of the devices, in order to enable redirection between printers. This is also expensive to implement.

SUMMARY

One exemplary method embodiment herein creates a printer compatibility matrix. The methods herein determine which print drivers are being used within a printing environment and identify a plurality of print queues. Each of the print queues is associated with one of the print drivers.

The methods herein submit a plurality of test documents (which are sometimes referred to herein as "witness" documents) to each of the print queues to produce a plurality of page description language (PDL) files. The test documents include printing items spanning a range of items expected to be submitted to the printing environment. Each of the print drivers produces one PDL file for each of the test documents within a corresponding one of the print queues.

The methods herein determine the type of each of the PDL files that were produced by the print drivers in response to the submission of the test documents. Then, the methods herein identify print drivers that produce different types of PDL files as being non-compatible with each other.

Rather than just labeling the other print drivers (that produce the same type of PDL files) as then being compatible (which may not always be the correct conclusion) the embodiments herein go further and compare all commands within header portions of corresponding ones of the same type PDL files (in any order). Then, only if corresponding same-type PDL files produced by different ones of the print drivers (in response to the test documents) contain all identical header commands (in any order) do the embodiments herein identify the different print drivers as being compatible.

Additionally, the methods herein do not just conclude that the remainder of such print drivers are non-compatible. To the contrary, if PDL files produced by different print drivers (in response to the test documents) do not contain all identical header commands, the methods herein identify the different ones of the print drivers as being merely "potentially" non-compatible, and continue to see if conversion/adaptation of the PDL files can make such print drivers compatible.

Thus, for the print drivers identified as being potentially non-compatible, the method embodiments herein perform a command conversion process on the PDL files produced by the potentially non-compatible print drivers to create converted PDL files. The command conversion process converts the commands within the header portions into standardized PDL commands. The embodiments herein can then compare the standardized PDL commands within the converted PDL files.

If corresponding ones same-type of the converted PDL files associated with different ones of the potentially non-compatible print drivers contain all identical header commands, the methods herein identify the different ones of the potentially non-compatible print drivers as being "compatible with adaptation." However, if the corresponding ones of the converted PDL files associated with different ones of the potentially non-compatible print drivers do not contain identical header commands, the embodiments herein must identify such different ones of the potentially non-compatible print drivers as being non-compatible.

The foregoing allows the embodiments herein to produce a compatibility matrix listing which of the print drivers are non-compatible, which of the print drivers are compatible, and which of the print drivers are compatible with adaptation. Each of the print queues is associated with a target printer. Thus, the compatibility matrix lists which print drivers can be used with target printers.

In another embodiment herein, a computerized device includes a processor, and a communications port operatively connected to the processor. The communications port is also connected to a computerized network external to the computerized device. The computerized device is operatively connected to a printing device and to a plurality of different printing devices through the computerized network.

The processor determines which print drivers are being used within a printing environment. The processor identifies a plurality of print queues. Each of the print queues is associated with one of the print drivers. The processor submits a plurality of test documents to each of the print queues to produce a plurality of page description language (PDL) files. The processor identifies print drivers that produce different types of PDL files as being non-compatible.

If corresponding PDL files produced by different ones of the print drivers in response to the test documents contain all identical header commands (in any order) the processor identifies the different ones of the print drivers as being compatible. If corresponding PDL files produced by different ones of the print drivers in response to the test documents do not contain all identical header commands, the processor identifies the different ones of the print drivers as being non-compatible. The processor produces a compatibility matrix listing which of the print drivers are non-compatible and which of the print drivers are compatible.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

This disclosure describes various processes for determining printer compatibility. Printer compatibility can be determined by a scheduled task, and printer compatibility data is made available to any applications that can make use of it. Printer compatibility is determined by, for example, comparing page description language (PDL) files produced by different drivers and testing the PDL files for adaptability.

With embodiments herein, printer compatibility is determined automatically. No manual determination of printer compatibility is required and input is minimized. The database of printer compatibility information requires no manual maintenance, as long as the printer compatibility process is scheduled to execute periodically.

Provisions are made by embodiments herein to allow the administrator of the print output management system to override the data in cases where the process erroneously determines that two incompatible printers are compatible. In addition, the administrator of the print output management system may choose to force any two printers to be reported as compatible in cases where the process considers them incompatible.

The embodiments herein automatically determine compatibility, require less ongoing maintenance or expensive custom development, reduce the number of help desk calls, and increase the success rate of a user's print job, ensuring minimal impact on user productivity.

The processes and systems herein provide a process that makes use of different technologies to build and store a compatibility matrix for a set of output devices. The process can be scheduled to run in the background at some regular interval. The process may be chosen to be run at a time when no actual printing is allowed. The compatibility matrix that is produced contains information indicating whether automatic redirection of a print document from one output device in the set to another output device in the set is possible without re-spooling. The information in the compatibility matrix may be used in any system that has reason to re-direct print jobs. Examples are load balancing systems, print control systems or systems that attempt to provide a user with an alternative when the printer they tried to use is not available for any reason.

The solutions provided herein are intended for use in an office environment where multiple office level devices are in use, and more than one of those devices is of the same manufacturer/family of devices. This environment yields the best chance that a PDL document that was headed for one device could be automatically re-directed to another.

Many print devices support a common set of page description languages (PCL5, PCL6 and PostScript). By querying the device, one can automatically determine which standard page description language is supported by that device. The fact that two devices support the same page description language implies that a PDL file produced for one device could be re-directed to the other device. In practice, this is not always true because many manufacturers embed non-standard commands in the PDL file produced for their devices. These non-standard commands typically appear in the print job header portion of the PDL file. Non-standard commands in the PDL file may not be recognized by all devices and are likely to cause errors in output produced if that PDL is re-directed to another device.

With embodiments herein, a list of output devices to be tested for compatibility is obtained. For each device to be tested, the following is generally available: the model of the device; the PDL types supported by the device (the device can be queried for this information); and the driver being used for each queue to the device.

The embodiments herein utilize test documents to produce the PDL files, that are never actually printed. These test documents are sometimes referred to herein as "witness" documents and are used to determine which of the output devices being tested are compatible with each other. The witness documents contain data that covers a suitable range of possibilities for printer input (images, text, different fonts, copy count etc.).

The machine that is running the embodiments herein will have access to any applications required to submit the witness documents to output devices. For example, if image files are used as witness documents, then the process must have access to an image viewer that can be used to send the images to a printer. In some cases, a script may be required in order to facilitate automatic submission of the witness documents to print queues. When the embodiments herein are run, each of the witness documents will be submitted to all printers being tested for compatibility, and a copy of each corresponding PDL file produced is captured during spooling.

The processes described herein are automatically carried out and may be run at off-peak times or run in the background. None of the steps described here require any manual intervention.

One exemplary embodiment herein begins by enumerating the print drivers that are being used in the environment. For each print driver being used, this exemplary method selects one queue that uses the print driver. If there are multiple queues that use the same print driver, there is no reason to test both queues during this process.

Figure 1:
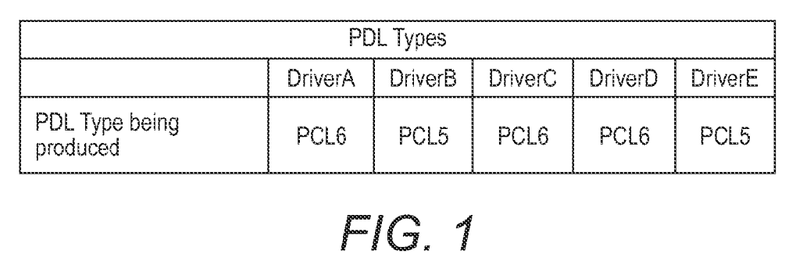
FIG. 1 is a chart diagram illustrating features of embodiments herein.

Next, each witness document is submitted to each queue. The embodiments herein then capture a snapshot of the PDL that is produced, without actually letting the job print. For example, rather than having the PDL file sent to an actual printer, it is redirected to a different location and stored. Alternatively, any known methodology of capturing files being transmitted to printing devices can be utilized with embodiments herein The captured PDL is examined to determine what type of PDL file is being produced by each driver, and the results are recorded. FIG. 1 illustrates example data for PDL type produced by each driver.

Figure 2:
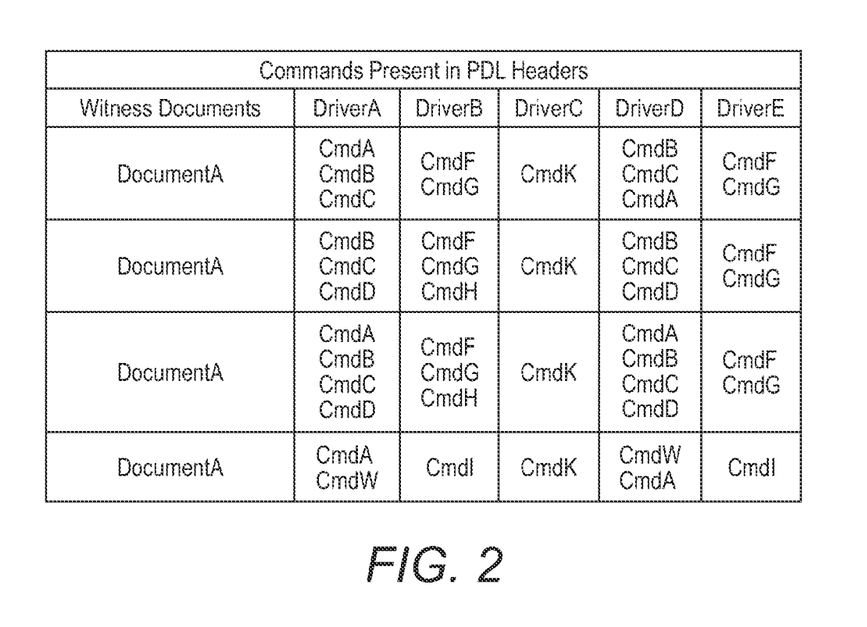
FIG. 2 is a chart diagram illustrating features of embodiments herein.

For each PDL file that was captured, this exemplary method inspects the header portion of the PDL. For each pair of drivers produced, the methods herein compare the commands specified in header of the PDL that was produced. Any comments in the header are ignored. Only commands are considered when comparing same-type PDL. If two same-type drivers produce the same set of commands for all witness documents, then they are considered compatible. The order of appearance of commands in the PDL is not important, as long as all commands appearing in the PDL file produced by both drivers are the same. The embodiments herein then record all cases where two drivers are found to be compatible. FIG. 2 illustrates the commands found in the captured PDL file headers.

As shown in FIG. 2, Driver A is compatible with Driver D because the PDL headers contain the same set of commands for each witness document tested. Driver B is not compatible with Driver E because the sets of PDL header commands they produced did not match for every witness document.

Next, the embodiments herein run a PDL adaptation process on all of the PDL files found to be not compatible, above. This process converts the commands found in the PDL header into standard PDL commands in the body of the PDL. While any conversion/adaptation methodology may be utilized with embodiments herein, one exemplary adaptation process is disclosed in co-pending patent application Ser. No. 12/626,750 (U.S. Patent Publication Number 2011/0128563; U.S. Pat. No. 8,451,465) the complete disclosure of which is incorporated herein by reference.

Figure 3:
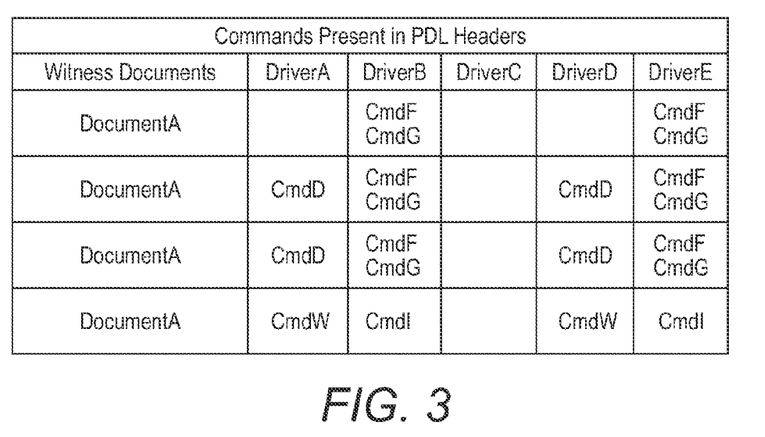
FIG. 3 is a chart diagram illustrating features of embodiments herein.

FIG. 3 illustrates the results of the adaptation process assuming, in this example that CmdA, CmdB, CmdC, CmdH and CmdK were able to be converted and moved into the PDL body. Thus, FIG. 3 illustrates commands found in captured PDL file headers after adaptation has been performed.

Figure 4:
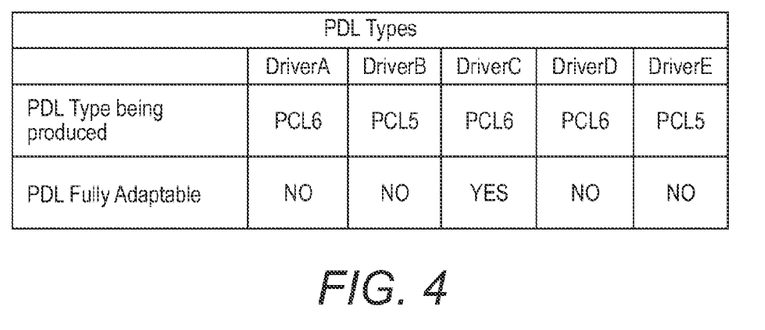
FIG. 4 is a chart diagram illustrating features of embodiments herein.

Next, the embodiments herein re-examine the PDL files after the adaptation process. For any driver that produced PDL files with commands that could all be converted to standard PDL, the embodiments herein flag that driver as one that produces completely adaptable PDL files. In the example shown in FIG. 3, Driver C falls into this category. Thus, FIG. 4 illustrates driver information with flags indicating adaptable PDL files.

Figure 5:
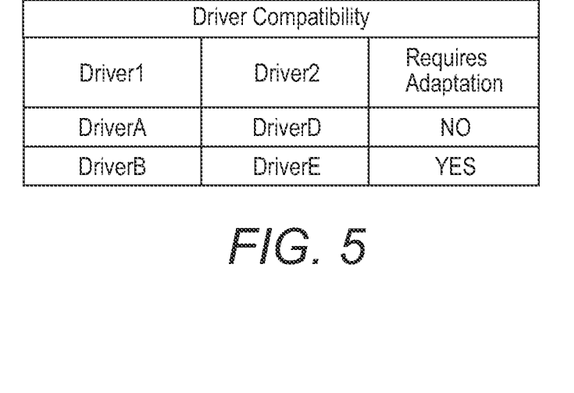
FIG. 5 is a chart diagram illustrating features of embodiments herein.

Next, using the post-adaptation versions of the PDL files, this exemplary method repeats the process of comparing the commands specified in header of the PDL described above for each driver pair that has not already been determined to be compatible. The embodiments herein flag all new cases where two drivers are found to be compatible with "Requires PDL Adaptation". Thus, as shown in FIGS. 5, Driver B and Driver E have a compatibility that requires adaptation.

Figure 6:
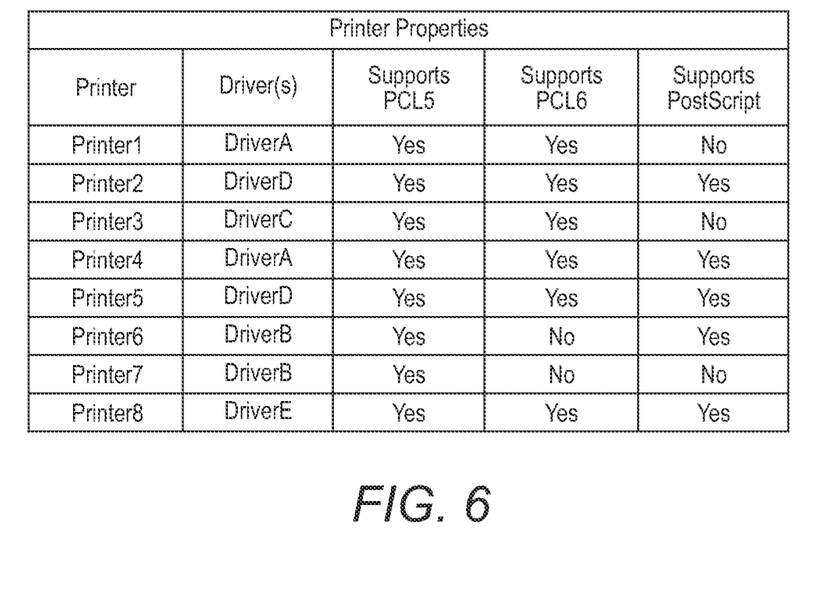
FIG. 6 is a chart diagram illustrating features of embodiments herein.

With the known information about the print devices being available (summarized in FIG. 6) a compatibility matrix (shown in FIG. 7) is generated indicating which devices PDL files can be redirected to, based upon the driver that produced the PDL. As shown in the compatibility matrix in FIG. 7, output from Driver A can be redirected to any device that makes use of Driver D and vice versa, output from Driver B can be redirected to any device that makes use of Driver E and vice versa, but only after the PDL adaptation algorithm has been run on the output, etc. Further, since the output from Driver C can be adapted to entirely standard PCL6, output from Driver C can be redirected to any device that supports PDL6 input, once adaptation has been performed on the output.

In some cases, the embodiments herein determine that output from a driver is compatible with a printer, but in practice the two drivers do not turn out to be compatible. The method may also determine that output from a driver is not compatible with a printer when the administrator knows that they are in fact compatible. In order to deal with these potential issues, the embodiments herein provide other optional features. The first is a table of incompatibility overrides. This table contains mappings of drivers to printers that must not be considered compatible. Mappings appearing in the compatibility table are not considered valid if they also appear in this table. The second table is a table of compatibility overrides. This table contains mappings that must be considered compatible. These mappings are added to the list of options for re-direction (if they are not already there) when compatibility data is requested. These additional tables ensure that the data in the compatibility matrix is useful even if the foregoing processes make an incorrect decision about compatibility.

Figure 7:
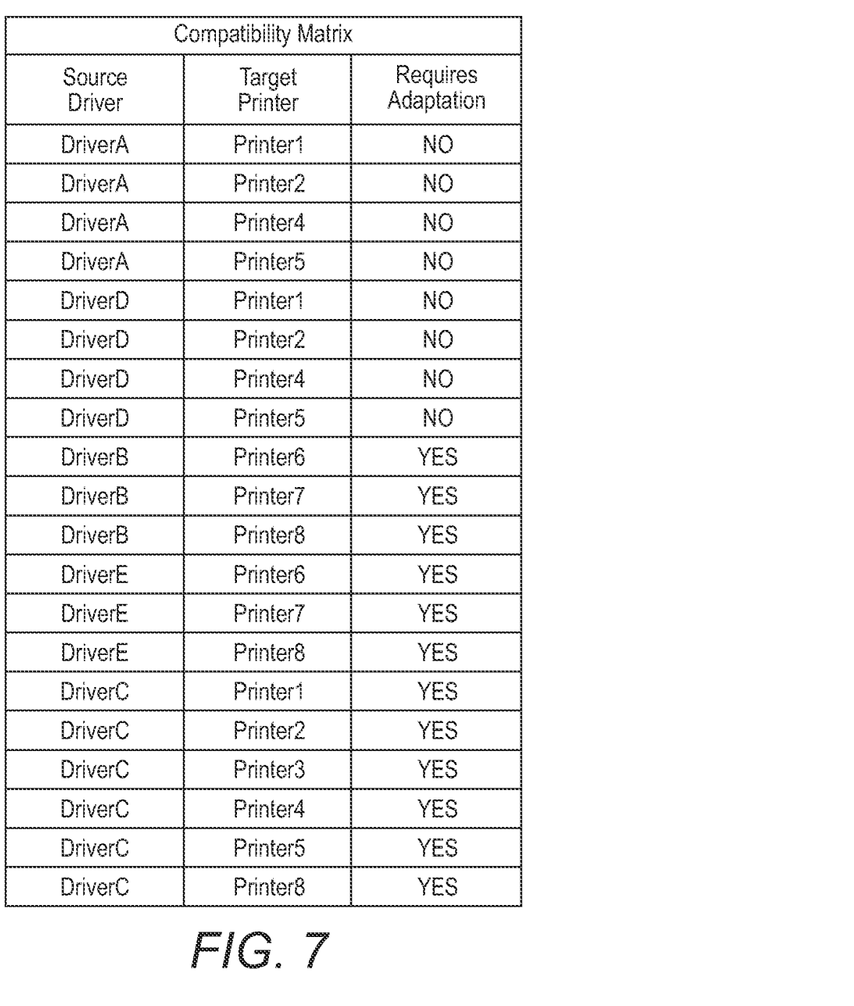
FIG. 7 is a chart diagram illustrating features of embodiments herein.

Once the compatibility matrix shown in FIG. 7 is completed, it can be used to re-route jobs. When an incoming job is not allowed to print for any reason (destination printer is offline, user is not allowed to print to destination printer, etc.) the PDL file is captured on the print server. The embodiments herein then find all records in the printer compatibility matrix shown in FIG. 7 with a source driver matching the original print queue's driver. The system selects one of the candidates in some way. This is done automatically with notice to the user, by presenting options to the user, etc. Once a selection is made, the embodiments herein perform PDL adaptation if required. Finally, the PDL is re-routed directly to the new destination printer.

Optionally, witness documents are organized into different categories, such as documents that contain images only or text only. This allows the embodiments herein to consider categories and to determine whether two printers that are not always compatible could be considered compatible in certain situations. The embodiments herein then execute the foregoing process, once for each document category. A separate compatibility table is then produced for each document category. In order to make effective use of this data, the systems and methods herein identify incoming print documents as belonging to one of the witness document categories.

A further option herein allows custom witness document categories created by the user or administrator. In this case, an administrator provides a set of witness documents that are treated as a custom document category. The system and methods herein execute the process described above using the provided witness documents. A separate compatibility table is then produced for this custom document type.

The custom witness document type functionality adds effectiveness to this process in environments where a particular type of document makes up a large percentage of the overall set of jobs printed. This functionality allows more printers to be considered compatible in such situations, and greatly increases the instances where print jobs are automatically re-routed without re-spooling. Thus, the print systems/methods herein are able to identify incoming print documents as belonging to the custom document categories, through the document name or some other indicator.

One feature of embodiments herein is that they are fully automatic and they intelligently determine in which cases there is the option to redirect a print job to a device other than the originally intended destination. This allows the system to make some level of guarantees about compatibility without placing a burden on a system administrator to configure the compatibilities.

Further, the compatibility matrix can be created by running a process at a time when no printing is taking place, in order to improve responsiveness of the system. Incorporating these embodiments into a printing environment improves the user experience in any case where their print job was not able to be printed at its original destination print device. The user is able to get their job printed quickly and efficiently by simply selecting one of the alternatives provided to them.

FIGS. 8-11 illustrates a printing device 300, which can be used with embodiments herein and can comprise, for example, a printer, copier, multi-function machine, etc. The printing device 300 includes a controller/processor 324, at least one marking device (printing engine) 310, 312, 314 operatively connected to the processor 324, a media path 316 positioned to supply sheets of media from a sheet supply 302 to the marking device(s) 310, 312, 314, and a communications port (input/output) 326 operatively connected to the processor 324 and to a computerized network external to the printing device. After receiving various markings from the printing engine(s), the sheets of media can optionally pass to a finisher 308 which can fold, staple, sort, etc., the various printed sheets.

Figure 8:
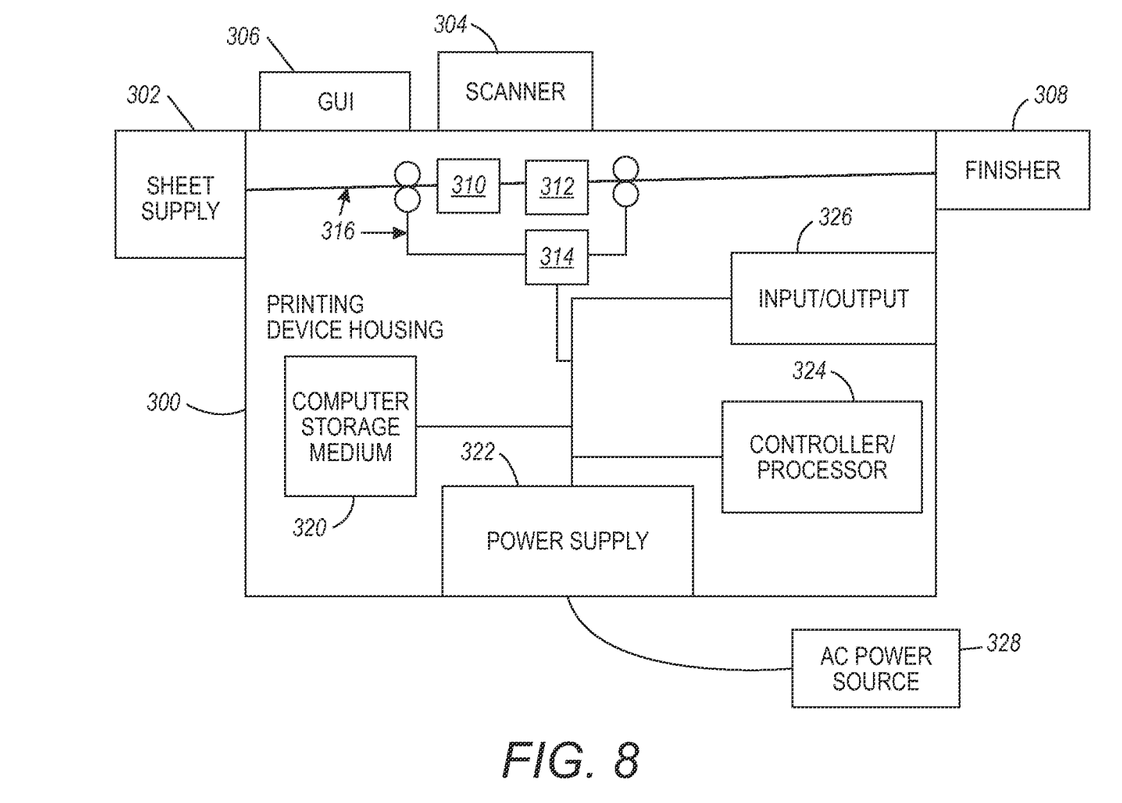
FIG. 8 is a side-view schematic diagram of a device according to embodiments herein.

Also, the printing device 300 can include at least one accessory functional component (such as a scanner/document handler 304, sheet supply 302, finisher 308, etc.) and graphic user interface assembly 306 that also operate on the power supplied from the external power source 328 (through the power supply 322).

The input/output device 326 is used for communications to and from the multi-function printing device 300. The processor 324 controls the various actions of the printing device. A non-transitory computer storage medium 320 (which can be optical, magnetic, capacitor based, etc.) is readable by the processor 324 and stores instructions that the processor 324 executes to allow the multi-function printing device to perform its various functions, such as those described herein.

Thus, a printer body housing 300 has one or more functional components that operate on power supplied from the alternating current (AC) 328 by the power supply 322. The power supply 322 connects to an external alternating current power source 328 and converts the external power into the type of power needed by the various components. As shown in FIGS. 4 and 5, such a computerized device 400 can be connected to a plurality of different printing devices 302.

As would be understood by those ordinarily skilled in the art, the printing device 300 shown in FIG. 8 is only one example and the embodiments herein are equally applicable to other types of printing devices that may include less components or more components. For example, while a limited number of printing engines and paper paths are illustrated in FIG. 8, those ordinarily skilled in the art understand that many more paper paths and additional printing engines could be included within any printing device used with embodiments herein.

Figure 9:
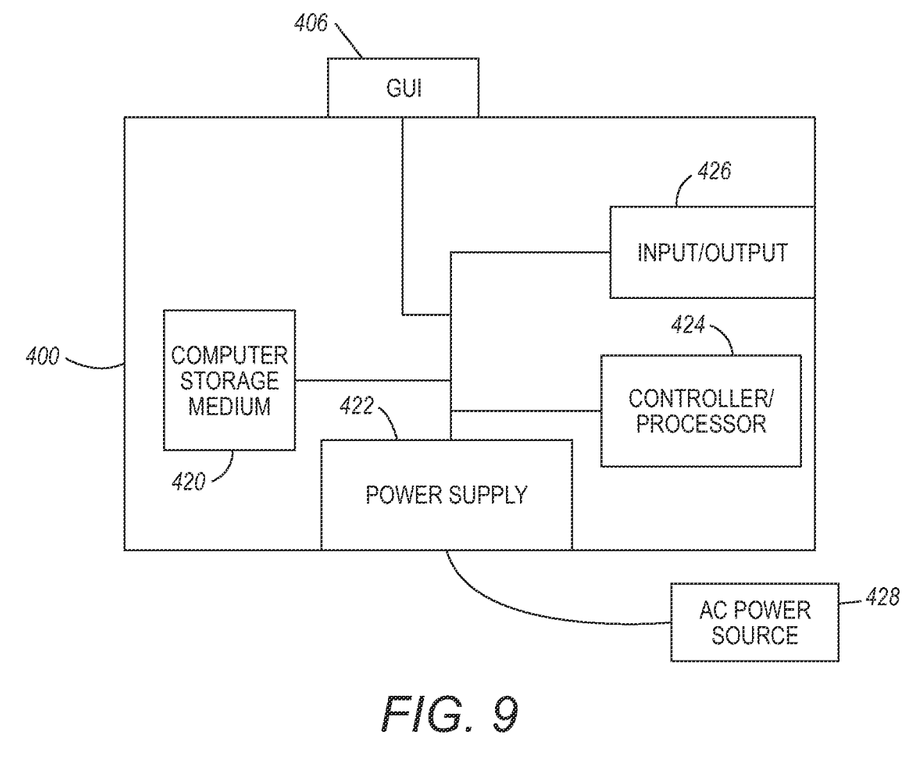
FIG. 9 is a side-view schematic diagram of a device according to embodiments herein.
Figure 10:
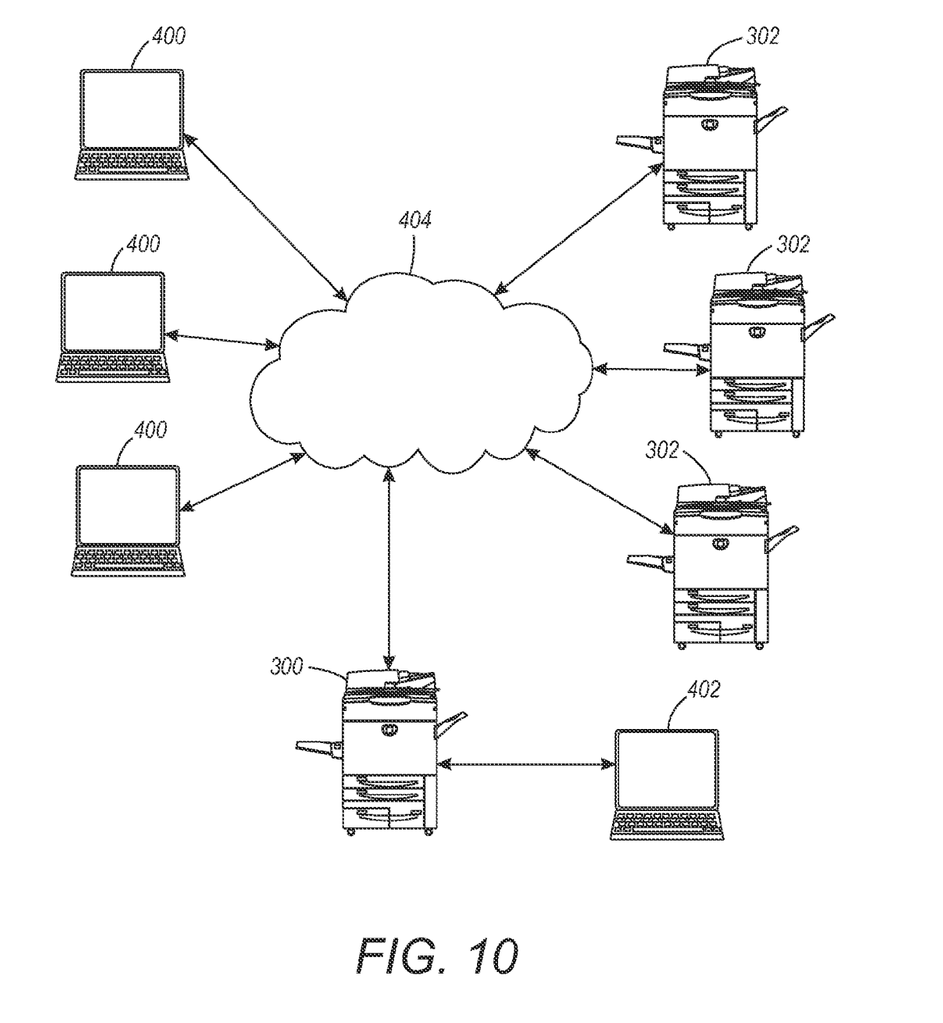
FIG. 10 is a side-view schematic diagram of a device according to embodiments herein.

As shown in FIGS. 9 and 10, further embodiments herein comprise at least one computerized device 400 that includes a controller/processor 424, and a communications port (input/output) 426 operatively connected to the processor 424 and to a computerized network 404 external to the computerized device 400. The computerized device 400 is operatively connected to a printing device (such as printing device 300 discussed above) and to a plurality of different printing devices 302 through the computerized network 404. The other printing devices 302 have details similar to those shown in FIG. 8, but may use different raster image processors, different hardware and software protocols, etc.

The processor 424 determines which print drivers are being used within a printing environment. The processor 424 identifies a plurality of print queues. Each of the print queues is associated with one of the print drivers. The processor 424 submits a plurality of test documents to each of the print queues to produce a plurality of page description language (PDL) files. The processor 424 identifies print drivers that produce different types of PDL files as being non-compatible.

If corresponding PDL files produced by different ones of the print drivers in response to the test documents contain all identical header commands (in any order) the processor 424 identifies the different ones of the print drivers as being compatible. If corresponding PDL files produced by different ones of the print drivers in response to the test documents do not contain all identical header commands, the processor 424 identifies the different ones of the print drivers as being non-compatible. The processor 424 produces a compatibility matrix listing which of the print drivers are non-compatible and which of the print drivers are compatible.

The processor 424 compares all commands within header portions of corresponding ones of the same type PDL files (in any order). Then, only if corresponding PDL files produced by different ones of the print drivers (in response to the test documents) contain all identical header commands (in any order) does the processor 424 identify the different print drivers as being compatible.

Additionally, if PDL files produced by different print drivers (in response to the test documents) do not contain all identical header commands the processor 424 identifies the different ones of the print drivers as being merely "potentially" non-compatible, and continues to see if conversion/adaptation of the PDL files can make such print drivers compatible.

Thus, for the print drivers identified as being potentially non-compatible, the processor 424 performs a command conversion process on the PDL files produced by the potentially non-compatible print drivers to create converted PDL files. The command conversion process converts the commands within the header portions into standardized PDL commands. The processor 424 can then compare the standardized PDL commands within the converted PDL files.

If corresponding ones of the converted PDL files associated with different ones of the potentially non-compatible print drivers contain all identical header commands, the processor 424 identifies the different ones of the potentially non-compatible print drivers as being "compatible with adaptation." However, if the corresponding ones of the converted PDL files associated with different ones of the potentially non-compatible print drivers do not contain identical header commands, the processor 424 identifies such different ones of the potentially non-compatible print drivers as being non-compatible.

Figure 11:
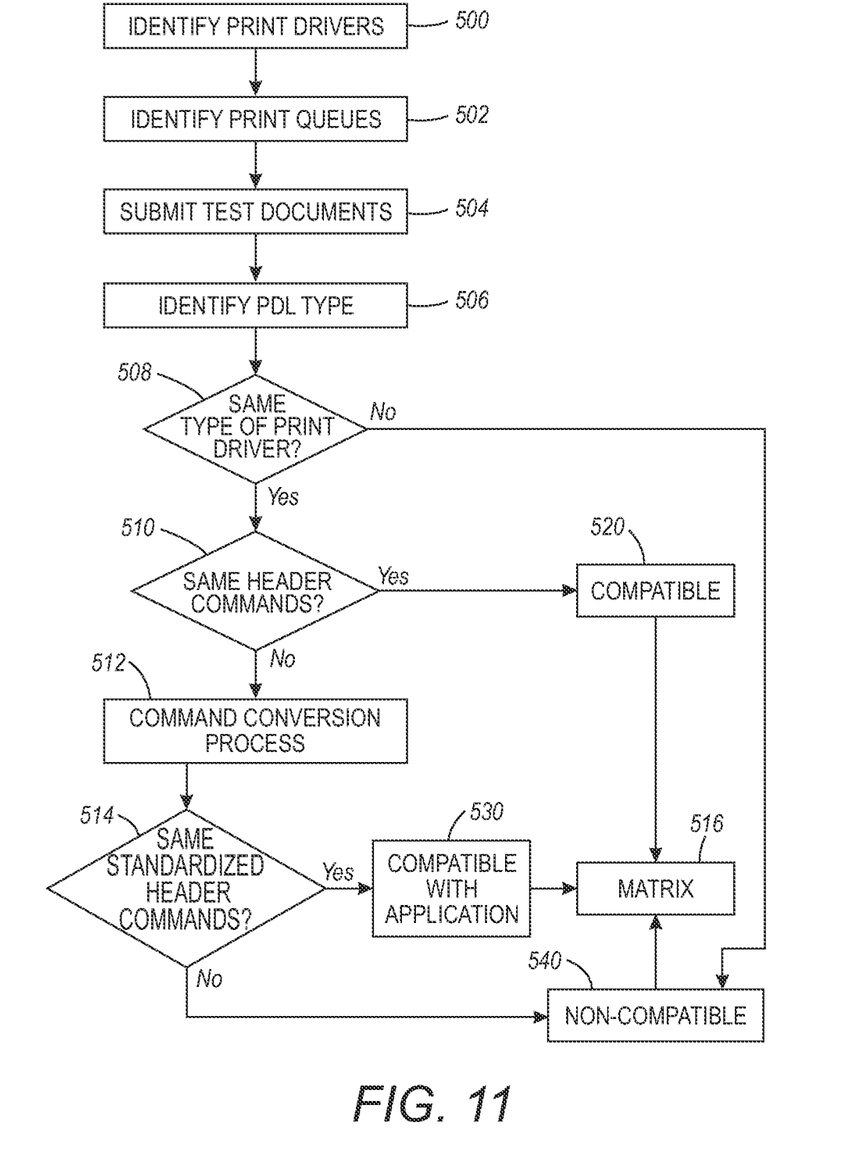
FIG. 11 is a flow diagram illustrating embodiments herein.

As shown for example in FIG. 11, exemplary methods herein create a printer compatibility matrix. In item 500, these exemplary methods determine which print drivers are being used within a printing environment and identify a plurality of corresponding print queues (item 502). Each of the print queues is associated with one of the print drivers.

The methods herein submit different test documents to each of the print queues to produce page description language (PDL) files in item 504. The test documents include printing items spanning a range of items expected to be submitted to the printing environment (images, text, etc.) Each of the print drivers produces one PDL file for each of the test documents within a corresponding print queue.

In item 506, the methods herein determine the type of each of the PDL files that were produced by the print drivers in response to the submission of the test documents. In item 508, the methods herein identify print drivers that produce different types of PDL files as being non-compatible with each other (to item 540).

Rather than just labeling the other print drivers (that produce the same type of PDL files) as then being compatible (which may not always be the correct conclusion) the embodiments herein go further and compare all commands within header portions of corresponding ones of the same-type PDL files (in any order) in item 510. Then, only if corresponding PDL files produced by different ones of the print drivers (in response to the test documents) contain all identical header commands (in any order) do the embodiments herein identify the different print drivers as being compatible (to item 520).

Additionally, the methods herein do not just conclude that the remainder of such print drivers are non-compatible. To the contrary, if PDL files produced by different print drivers (in response to the test documents) do not contain all identical header commands (in item 510) the methods herein identify the different ones of the print drivers as being merely "potentially" non-compatible, and continue to see if conversion/adaptation of the PDL files can make such print drivers compatible.

Thus, for the print drivers identified as being potentially non-compatible in item 510, the method embodiments herein perform a command conversion process on the PDL files produced by the potentially non-compatible print drivers to create converted PDL files in item 512. The command conversion process converts the commands within the header portions into standardized PDL commands. The embodiments herein can then compare the standardized PDL commands within the converted PDL files in item 514.

If corresponding ones of the converted PDL files associated with different ones of the potentially non-compatible print drivers contain all identical header commands in item 514, the methods herein identify the different ones of the potentially non-compatible print drivers as being "compatible with adaptation" (to item 530). However, if the corresponding ones of the converted PDL files associated with different ones of the potentially non-compatible print drivers do not contain identical header commands in item 514, the embodiments herein must identify such different ones of the potentially non-compatible print drivers as being non-compatible (to item 540).

The foregoing allows the embodiments herein to produce a compatibility matrix listing which of the print drivers are non-compatible, which of the print drivers are compatible, and which of the print drivers are compatible with adaptation in item 516. Each of the print queues is associated with a target printer. Thus, the compatibility matrix lists which print drivers can be used with target printers.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A method of creating a printer compatibility matrix comprising:

determining which print drivers are being used within a printing environment;

identifying a plurality of print queues, each of said print queues being associated with one of said print drivers;

submitting a plurality of test documents to each of said print queues to produce a plurality of page description language (PDL) files;

identifying print drivers that produce different types of PDL files as being non-compatible;

if corresponding PDL files produced by different ones of said print drivers in response to said test documents are of the same type and contain all identical header commands, identifying said different ones of said print drivers as being compatible;

if corresponding PDL files produced by different ones of said print drivers in response to said test documents are of the same type and do not contain all identical header commands, identifying said different ones of said print drivers as being potentially non-compatible print drivers;

for said print drivers identified as being potentially non-compatible, performing a conversion process on said PDL files produced by said potentially non-compatible print drivers to create converted PDL files;

if corresponding ones of said converted PDL files associated with different ones of said potentially non-compatible print drivers contain all identical header commands, identifying said different ones of said potentially non-compatible print drivers as being compatible with adaptation; and producing a compatibility matrix listing which of said print drivers are non-compatible, which of said print drivers are compatible, and which of said print drivers are compatible with adaptation.

2. The method according to claim 1, said test documents including items spanning a range of items expected to be submitted to said printing environment.

3. The method according to claim 1, said identical header commands being in different orders within said PDL files that contain said identical header commands.

4. The method according to claim 1, said compatibility matrix listing which print drivers can be used with target printers.

5. The method according to claim 1, each of said print queues being associated with a target printer.

6. A method of creating a printer compatibility matrix comprising:

determining which print drivers are being used within a printing environment;

identifying a plurality of print queues, each of said print queues being associated with one of said print drivers;

submitting a plurality of test documents to each of said print queues to produce a plurality of page description language (PDL) files, each of said print drivers producing one PDL file for each of said test documents within a corresponding one of said print queues;

determining the type of each of said PDL files that were produced by said print drivers in response to said submitted of said test documents;

identifying print drivers that produce different types of PDL files as being non-compatible print drivers;

for print drivers that produce the same type of PDL files, comparing commands within header portions of corresponding ones of said PDL files;

if corresponding PDL files produced by different ones of said print drivers in response to said test documents are of the same type and contain all identical header commands, identifying said different ones of said print drivers as being compatible;

if corresponding PDL files produced by different ones of said print drivers in response to said test documents are of the same type and do not contain all identical header commands, identifying said different ones of said print drivers as being potentially non-compatible print drivers;

for said print drivers identified as being potentially non-compatible, performing a command conversion process on said PDL files produced by said potentially non-compatible print drivers to create converted PDL files, said command conversion process converting said commands within said header portions into standardized PDL commands;

comparing said standardized PDL commands within said converted PDL files associated with said potentially non-compatible print drivers;

if corresponding ones of said converted PDL files associated with different ones of said potentially non-compatible print drivers contain all identical header commands, identifying said different ones of said potentially non-compatible print drivers as being compatible with adaptation;

if corresponding ones of said converted PDL files associated with different ones of said potentially non-compatible print drivers do not contain all identical header commands, identifying said different ones of said potentially non-compatible print drivers as being non-compatible; and producing a compatibility matrix listing which of said print drivers are non-compatible, which of said print drivers are compatible, and which of said print drivers are compatible with adaptation.

7. The method according to claim 6, said test documents including items spanning a range of items expected to be submitted to said printing environment.

8. The method according to claim 6, said identical header commands being in different orders within said PDL files that contain said identical header commands.

9. The method according to claim 6, said compatibility matrix listing which print drivers can be used with target printers.

10. The method according to claim 6, each of said print queues being associated with a target printer.

11. A computerized device comprising:

a processor; and a communications port operatively connected to said processor and to a computerized network external to said computerized device, said computerized device being operatively connected to a printing device and to a plurality of different printing devices through said computerized network, said processor determining which print drivers are being used within a printing environment;

said processor identifying a plurality of print queues, each of said print queues being associated with one of said print drivers;

said processor submitting a plurality of test documents to each of said print queues to produce a plurality of page description language (PDL) files;

said processor identifying print drivers that produce different types of PDL files as being non-compatible;

if corresponding PDL files produced by different ones of said print drivers in response to said test documents are of the same type and contain all identical header commands, said processor identifying said different ones of said print drivers as being compatible;

if corresponding PDL files produced by different ones of said print drivers in response to said test documents are of the same type and do not contain all identical header commands, said processor identifying said different ones of said print drivers as being potentially non-compatible print drivers;

for said print drivers identified as being potentially non-compatible, said processor performing a conversion process on said PDL files produced by said potentially non-compatible print drivers to create converted PDL files;

if corresponding ones of said converted PDL files associated with different ones of said potentially non-compatible print drivers contain all identical header commands, said processor identifying said different ones of said potentially non-compatible print drivers as being compatible with adaptation; and said processor producing a compatibility matrix listing which of said print drivers are non-compatible, which of said print drivers are compatible, and which of said print drivers are compatible with adaptation.

12. The computerized device according to claim 11, said test documents including items spanning a range of items expected to be submitted to said printing environment.

13. The computerized device according to claim 11, said identical header commands being in different orders within said PDL files that contain said identical header commands.

14. The computerized device according to claim 11, said compatibility matrix listing which print drivers can be used with target printers.

15. The computerized device according to claim 11, each of said print queues being associated with a target printer.

* * * * *